May 16, 1944.　　　J. S. JACOBSON　　　2,348,818
PROJECTION OF IMAGES
Filed June 24, 1941
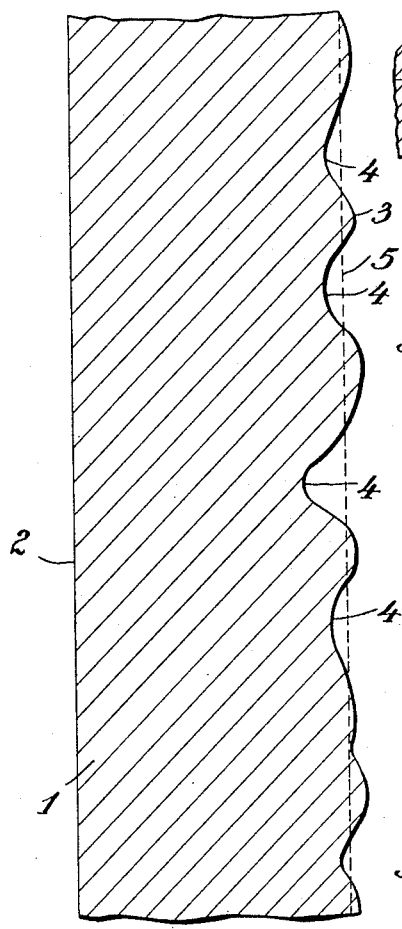
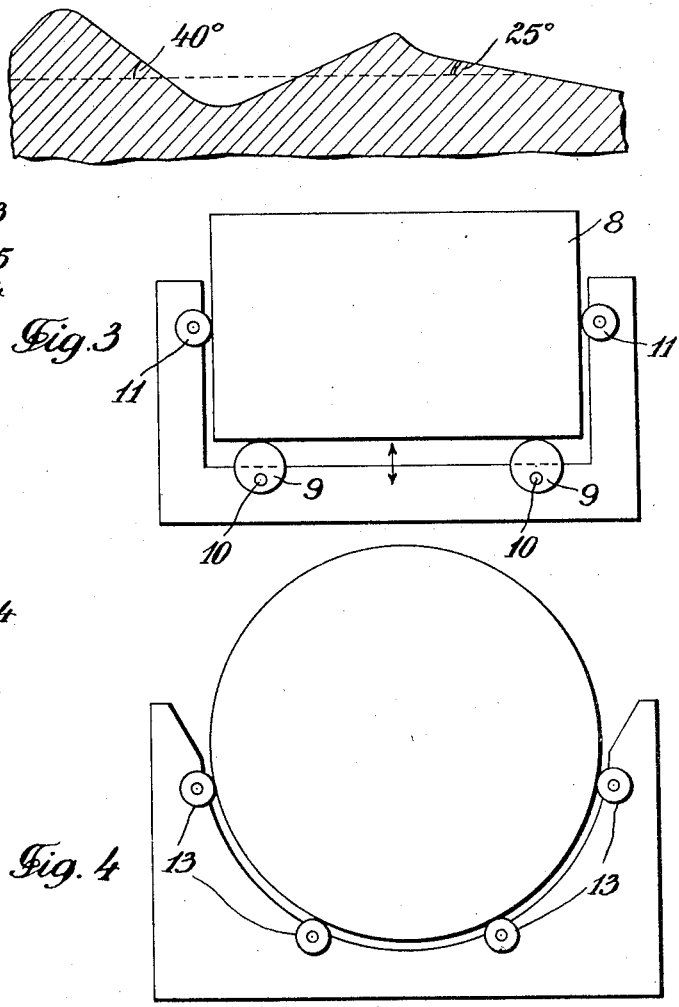
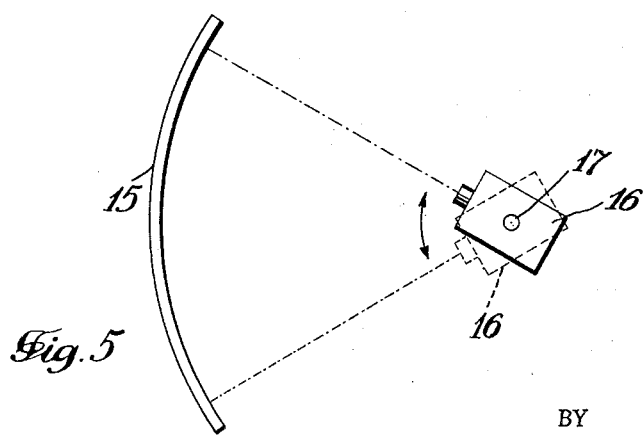
INVENTOR:
Johan Sam Jacobson
BY
ATTORNEYS.

Patented May 16, 1944

2,348,818

UNITED STATES PATENT OFFICE 2,348,818

PROJECTION OF IMAGES

Johan Sam Jacobson, The Hague, Netherlands; vested in the Alien Property Custodian Application June 24, 1941, Serial No. 399,443
In the Netherlands February 7, 1940

1 Claim. (Cl. 88—28.93)

This invention relates to the projection of images and is concerned quite particularly with projection of such images in full daylight or in lighted rooms.

The invention includes novel kinds of projection screens, the arrangement of projection apparatus in respect to such screens and means for moving projection screens so as to obtain particularly useful effects.

Other objects of this invention will appear as the specification proceeds.

Many attempts have been made to provide means for a perfect projection of images, stationary and moving, in full daylight or in artificially lighted rooms, in such manner as to render all parts of the projected images fully and clearly visible to a large audience. The screens used for this purpose were either impervious to light or of translucent or transparent materials and the images were either projected on to the front surface of the screen facing the audience so as to be seen by reflection, or on to the rear side, the light rays then traversing the screen material and becoming visible on the front side after having undergone refraction.

The impervious screens used to this end were imparted an increased reflecting power by covering them with metal, more particularly metal powder, with small particles mostly in the form of pearls, of glass or some other light reflecting material. This mode of projection involves drawbacks, more particularly in view of the weakening influence of diffused light present in the projection room and more particularly by a weakening and change of coloring.

When projecting images on to the rear side of transparent or translucent screens made of glass, plastics or the like, either one or both screen surfaces were unevenly formed, visibility of the images being obtained by the reflection and diffusion of the light rays projected almost parallelly on the plane rear surface of the screen, when traversing the uneven front surface, while daylight or artificial light either traverses the screen or was diffused thereon in such manner as not to be reflected in a direction towards the audience. In these transparent or translucent screens the screen surface was rendered uneven by arranging thereon convex or concave elements which acted in the manner of lenses or lens parts, each of which transmits to the audience the reproduction of part of the light source arranged to the rear of the screen. The totality of all these partial images is then viewed by the eyes of the audience as a strong image rich in contrasts and if a colored image is projected, the colors retain all their power.

In all cases where screens made of glass, a plastic or some other transparent or translucent material were used, the uneven surface was formed of light reflecting or refracting elements of uniform shape and configuration which were evenly and uniformly distributed over the screen surface, being either formed from the screen material by a casting or pressing process or being embedded therein or mounted on the screen surface. However, the uniform subdivision of the surface involves the drawback that since the reflecting elements forming the screen surface cannot be made sufficiently small, the projected image is coarse and unfit for projection whenever particularly clear and sharp images are required, as for instance in television apparatus.

Moreover, all regularly subdivided screen surfaces show a diffraction phenomenon which produces, besides the projected image, a secondary luminous image which forms a great disturbance.

These and other drawbacks and deficiencies of subdivided translucent or transparent screens are avoided if, in accordance with this invention, either one or both screen surfaces are subdivided in a non-uniform manner by means of irregularly formed convex and/or concave projections and depressions, the surfaces of which are so arranged that the cross-section of any such projection is viewed by the audience at an angle which does not exceed a few minutes of an arc and preferably is not smaller than $\tfrac{1}{10}$ of such minute.

The irregularity of formation of the projection surface, i. e., the local differences in the screen surface, may be increased further, in accordance with this invention by moving the screen during projection in the planes in which its surfaces are located. These screen movements may have the character of vibrations.

The actual size of the uneven screen particles may for instance be 0.5 to 5 mm. in the direction of the screen surface and 0.25 to 2 mm. in the direction normal to this surface.

Preferably the medium angle of inclination of the irregularly distributed faces of the projections and depressions forming in their totality the screen surface should not be smaller than one degree and not greater than about 45 degrees.

The non-uniformity or irregularity of the projections and depressions which in their totality constitute the screen surface are intended to do away with the diffraction phenomenon which hitherto impaired the projection of images. Obviously no altogether perfect irregularity is required and in most cases complete irregularity within an area of 100 or better still 400 square centimeters will be sufficient, which means that a plurality of such areas, each of which displays the same perfect irregularity of its surface, may be combined to form the screen surface. Obviously when composing this surface of a plurality of irregularly formed areas care should be taken to avoid the formation of surface parts which extend in parallel to the smooth or even surface of the screen.

The circumstance that the cross-section of a projection on the screen surface is viewed by the observer at an angle which does not exceed a few minutes of an arc and preferably is not smaller than $\frac{1}{5}$ of such minute guarantees a sufficient visibility of each detail and consequently a particularly finely subdivided image. On the other hand this provision prevents total reflexion from occurring in view of an unduly subdivided surface.

If the screen is moved in its plane during projection, a further irregularity of the visible surface is obtained by such movement, whereby the quality of the images is still further improved, more especially if this movement is so timed that the projections and depressions of the screen surface cross any individual viewpoint within a very short period of time, for instance within $\frac{1}{4}$ of a second or less, whereby the inertia of vision of the human eye is utilized to produce a perfect image. Thus for instance if an observer looks at a line projected on to the screen the clearness of the image of this line is determined by the surface structure of the screen and the line image will be imperfect in certain points because the light rays reflected from parts of the surface do not enter the eye. If however the screen is moved in its plane, the visible structure of the surface at each point of the screen varies constantly and certain points of the line image which, when stationary, are not clearly defined, will become clear the next moment so that by permanently moving the screen in its plane a clearer image is obtained. In this manner for instance small letters of a projected text which on a stationary screen would be illegible will become clearly legible.

In the drawing affixed to this specification and forming part thereof some embodiments of this invention are illustrated diagrammatically by way of example.

In the drawing,

Fig. 1 is a cross-section, drawn to an exaggerated scale, of part of a screen of translucent or transparent material.

Fig. 2 is a similar view of part of a screen which illustrates the difference of the angles of inclination of the surface of projections and depressions formed on the screen surface.

Fig. 3 is a diagram showing means for imparting to a screen reciprocatory movements in vertical direction.

Fig. 4 is a similar view of means for imparting to a screen of circular configuration permanent rotatory movement.

Fig. 5 is a diagram showing the arrangement of a curved screen and the projection apparatus cooperating with it.

Referring to the drawing and first to Fig. 1, 1 is a plate made for instance of glass or a plastic, which is translucent or transparent and may for instance be 2–5 mm. thick. The surface 2 of this screen may be even, while the other surface is rendered uneven by the formation of projections 3 and depressions 4, which subdivide the virtual surface 5 of the screen in an altogether irregular and non-uniform manner as far as both the horizontal and vertical directions of the surface are concerned. The differences between the highest and the deepest points of these projections and depressions may be of the order of 0.1–3 mm., while the distance between adjoining projections or depressions may be of the order of about 0.2–6 mm.

As illustrated more particularly in Fig. 2, the angles of inclination of the different faces of these projections or depressions should vary. In Fig. 2, for example, the angle of inclination of one surface is shown as 25° while that of another surface is shown as 40°.

By varying the magnitude of the medium angle of inclination of these projections and/or depressions, the angle under which the image can be viewed may be influenced either for the entire screen surface or for one or the other side.

Fig. 3 illustrates in a purely diagrammatic manner means for reciprocating the screen in vertical direction. Here the screen 8 rests on eccentric rollers 9 mounted on spindles 10 which are driven by suitable means, not shown. 11 are rollers restraining the screen against horizontal movement while allowing it to move in a vertical direction. Obviously the rapidly rotating rollers 9 make the screen execute rapid vertical movements whereby the position of all points of the screen surface is continuously changed and the clearness of the image improved.

The screen 12 of circular contour shown in Fig. 4 is mounted on four rollers 13 arranged on a circle. By driving these rollers the screen is rotated in its plane and the position of all points continuously changed with a similar result as heretofore described.

Improvement of the clearness of the image is obtained also by projecting it on a screen curved according to a circle drawn around a point about which the projector can be turned. This is shown in Fig. 5 where 15 is the screen, 16 the projector and 17 the pivot point about which the projector can be reciprocated. The axis of such oscillatory reciprocation may extend vertically or horizontally according to whether the curve of the screen extends in a horizontal or a vertical plane. Here, instead of moving the screen, the image is moved by reciprocating the projector, but the effect is the same.

Glass is only one of the materials adapted for use in making the screens. The use of plastics of the artificial resin type or of other kinds, including condensation products of phenols and aldehydes, vinyl compounds, styrene compounds, etc. offers the advantage of lighter weights and greater strength enabling thinner plates to be used which can more readily be set moving. The production of the irregular surface or surfaces may also be easier with a plastic than with glass, the plastic plate being adapted to be shaped in a press while a glass plate must be rolled in hot condition.

A plastic plate may also be produced by a casting process. I may however also spray a transparent substance, either molten or dissolved in a suitable solvent onto the surface of a glass or plastic plate, allowing the liquid substance to dry on the plate, with the sprayed surface of the plate lowermost.

A screen, one surface of which is plane, may also be used with the plane surface facing the audience. However, in that case, reflection of light from the outside may impair visibility of the images projected on to the uneven rear surface. If both screen surfaces are rendered uneven by irregularly formed and arranged projections and depressions, the screen should be thin, for otherwise, in consequence of refraction phenomena, the clearness of the images may be unsatisfactory.

The screens according to the invention can for instance be used for daylight advertising in the open air and curved screens will in such a case be preferable in order to render the images visible throughout a larger angle. In that case the arrangement according to Fig. 5 will prove useful.

Since the reproduction of colors is particularly good with screens of this kind, photographic reproductions of luminous signs can be projected.

The invention may further be used for projecting signals along railroad tracks, public roads etc. In stations information to the public can be given by projection.

The new screens will be particularly useful in connection with television receivers inasmuch as the clearness of the image in all its details and the richness of contrasts enable the images to be greatly enlarged.

I do not wish to be limited to the exact details of my invention as described in the foregoing specification as various changes may occur to a person skilled in the art.

I claim:

In a picture projection screen comprising a light permeable material having two vertically disposed surfaces on at least one of which surfaces irregular projections and depressions are formed, the combination wherein the projections and depressions provide the surface on which they are formed with a generally sinusoidal curved cross section having undulations of varying amplitude and of different length, said undulations intersecting the surface on which they are formed, and the slope of a plane tangent to any undulation at the intersection of the undulation with said surface lying between angular limits of from one to forty-five degrees.

JOHAN SAM JACOBSON.